July 2, 1935.     R. W. POST     2,006,604

FISH LURE

Filed May 25, 1934

Inventor
Raymond W. Post
By Lyon & Lyon
Attorneys

Patented July 2, 1935

2,006,604

UNITED STATES PATENT OFFICE 2,006,604

FISH LURE

Raymond W. Post, Van Nuys, Calif.

Application May 25, 1934, Serial No. 727,453

1 Claim. (Cl. 43—46)

This invention relates to artificial baits to be employed as fish lures and more particularly to artificial minnows.

An object of the invention is to provide a lure, the appearance of which may be readily altered by the fisherman at his discretion.

Another object is to provide a lure that is easily and inexpensively manufactured and can be readily assembled and disassembled.

Another object is to provide a lure having a body portion formed largely of glass or other brittle material with a connecting link (for connecting the lure between a leader and a hook) retained therein in such a manner as to impose little or no strain on the glass body portion.

Briefly, the invention comprises an imitation bait having a body portion formed of two halves of transparent material, such as glass, with a piece of sheet material positioned between the halves and gripped therebetween to give a desired distinctive appearance. Thus the sheet of material may be of any desired color or have a suitable design thereon and by substituting different sheets of different designs or colors the appearance of the bait may be changed.

A full understanding of the invention may be had from the following detailed description which refers to the drawing:

Figure 1:
Fig. 1 is an elevation view of one side of a bait in accordance with my invention.
Figure 2:
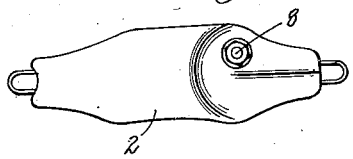
Fig. 2 is an elevation view of the opposite side of the bait shown in Fig. 1.
Figure 3:
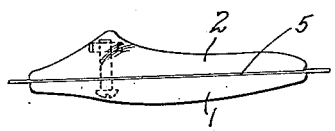
Fig. 3 is a plan view of the bait shown in elevation in Figs. 1 and 2.
Figure 6:
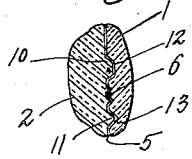
Fig. 6 is a cross section through the assembled bait, the section being taken in a plane intersecting the projection 10 of Fig. 4.
Figure 7:
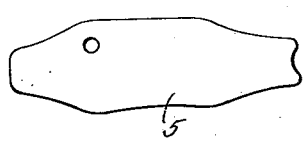
Fig. 7 is an elevation view of the lamina positioned between the two halves of the bait for giving it a desired distinctive appearance.

As shown in Figs. 1, 2 and 3, my bait comprises a body of material shaped in the general outline of a fish. The main body of the lure is composed of two complementary body members 1 and 2, respectively, having substantially flat juxtaposed surfaces 3 and 4, respectively, which fit together substantially along the median plane of the fish and grip therebetween a lamina 5 (Figs. 6 and 7), of sheet material, and a wire loop 6, the whole being retained together by a screw 7 and nut 8.

In the particular model shown, the body members 1 and 2 are of slightly different shape to cause the bait to move in an irregular fashion when drawn through the water but it is to be understood that both members 1 and 2 may be symmetrical and need not have the particular outlines illustrated. The body members 1 and 2 are preferably formed of glass, or other transparent material, and when made of glass they may be formed by a molding operation. Because of their transparency, the body members themselves do not determine the general appearance of the lure, it being determined mainly by the appearance of the lamina 5 inserted between the glass body members, which is distinctly colored or decorated to give any desired appearance.

The screw 7 is shown positioned in the head end of the fish to imitate the eyes thereof. To this end, the screw and nut are preferably made of some brightly finished material, such as nickel. Of course, if desired, the head of the screw and the nut may be painted some prominent distinctive color, such as a bright red.

The wire loop 6, which constitutes the means for attaching the lure to a fish line and to a hook positioned back of the lure, is positioned in grooves provided therefor in the surfaces 3 and 4 of the body members 1 and 2, respectively, so that when the members are clamped together by the screw 7 the wire loop lies loosely within the body and imposes no strains thereon. It will be observed that with the construction shown in Figs. 4 and 5 longitudinal stresses applied to the wire loop 6 cannot be transferred to the body members 1 and 2. However, in some instances it may be desirable to make the body members 1 and 2 of less brittle material than ordinary glass and in such case it may be desirable to bend the loop in zigzag shape and provide zigzag grooves therefor, as shown at 6a in Fig. 8. Obviously with such construction the wire loop will be held rigidly between the body members so that it has no free movement.

Figure 4:
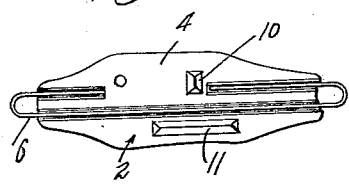
Fig. 4 is an elevation view of one half of the body portion of the bait showing the surface contacting with the other half.
Figure 5:
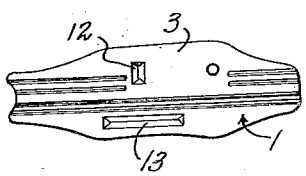
Fig. 5 is an elevation view showing the contact surface of the other half of the body portion of the bait.
Figure 8:
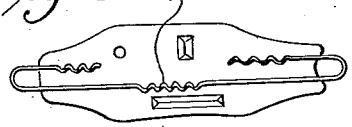
Fig. 8 is an elevation view of one half of the body portion of a modified form of bait.
Figure 9:
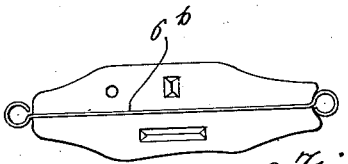
Fig. 9 is an elevation view of one half of still another modified form of bait.

In the embodiments illustrated in Figs. 4 and 8, it is impossible for the body member to rotate around the wire 6 or 6a as an axis. However, in case it is desired that the lure be free to rotate about the supporting wire, the construction disclosed in Fig. 9 may be employed, in which the wire has a straight portion extending straight through the body member, and eyes on the ends thereof beyond the body member for connection to the fish line and hook.

When only one screw is employed to hold the two body members 1 and 2 together, as shown in the drawing, it is necessary to provide cooperating interlocking parts on the two members to retain them in proper relative position. The wire 6 engaging with the walls of the grooves in which it is positioned tends to a certain extent to maintain the body members in alignment but it is desirable to provide other means for this purpose. To this end, the surface 4 of the body member 2 is provided with projections 10 and 11, which nest in cooperating depressions 12 and 13, respectively, in the surface 3 of the body member 1.

As stated hereinbefore, the lamina 5, which is clamped between the two body members 1 and 2, controls to a large extent the appearance of the completed lure. This lamina 5 may be made of various materials; tin foil may be used to give a silvery appearance or gold foil to give the appearance of gold. If other colors are desired, the lamina 5 may be made of water-proofed paper, either painted any desired solid color or provided with any desired design. Thus it might be speckled. Of course, there is a wide variety of materials that can be used to construct the lamina 5; thus rubber may be employed or any other flexible material. The lamina, of course, must conform to the projections 10 and 11 and their associated depressions 12 and 13 and for this reason should have a certain amount of elasticity.

My fish lure has a special appeal because it is possible to readily change the appearance by substituting different laminæ 5. the substitution being made by simply removing the nut 8 from the bolt 7, separating the two body members 1 and 2, taking out the old lamina, inserting a new one, and reassembling the device. The laminæ are very inexpensive so that each fisherman can carry a stock of laminæ having many different colors and/or designs thereon.

Figure 10:
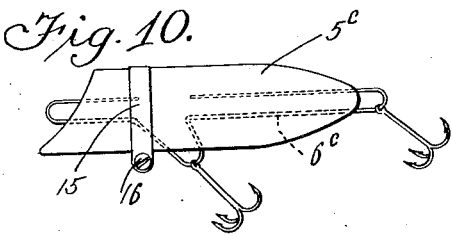
Fig. 10 is a side elevation view of a modified bait in which provision is made for the attachment of two hooks and in which the two halves of the body are held together by a band clamp.

A slightly modified form of construction is shown in Fig. 10. This form differs from that disclosed in Fig. 1 in that the two halves of the body portion are held together by a band 15 encircling the body, the ends of which are detachably secured together by a screw 16. A further distinction between the embodiment shown in Fig. 10 and that shown in Fig. 1 is that the wire loop 6c is bent to project from the body at three points instead of two. Thus the loop 6c, in addition to projecting from the forward end of the body to form a means of attaching the lure to a leader and from the rear end of the body for the attachment of a hook at that point, also projects from the under side of the body for the attachment at that point of another hook.

The body portion is preferably grooved circumferentially to receive the clamp 15 and prevent longitudinal displacement of the clamp after it has been secured in position. The lure shown in Fig. 10 is comprised of two body portions clamped together about the wire loop 6c and a lamina for giving a distinctive appearance exactly as in the case of the embodiment shown in Figs. 1 to 7, except of course that since there is no bolt extending through the body members and lamina, no aperture to receive the bolt need be provided in the lamina.

It is to be understood that although I prefer to position the wire loops between the two halves of the body portion in all of the modifications shown, the loop may if desired be solidly imbedded in one of the body members, in which case the assembly of the two body halves about the lamina is facilitated.

I claim:

A fish lure comprising a body of transparent material formed in two parts coextensive with each other and having their adjacent surfaces conformable with each other to fit together, a lamina of sheet material shaped to conform to the outline of said adjacent surfaces and positioned therebetween for giving the lure a desired distinctive appearance depending upon the color and/or design of the lamina, said adjacent surfaces of said two parts also having juxtaposed grooves therein, a wire loop adapted to fit in said grooves and extend beyond said body to constitute a connecting member, and means for releasably clamping said two body parts together about said lamina and said wire loop.

RAYMOND W. POST.